Patented July 4, 1933

1,916,617

UNITED STATES PATENT OFFICE

ERNST JAENECKE, OF HEIDELBERG, AND FRIEDRICH FROWEIN, OF LUDWIGSHAFEN-ON-THE-RHINE, GERMANY, ASSIGNORS TO I. G. FARBENINDUSTRIE AKTIENGE-SELLSCHAFT, OF FRANKFORT-ON-THE-MAIN, GERMANY, A CORPORATION OF GERMANY

MANUFACTURE OF MIXED FERTILIZERS

No Drawing. Application filed December 6, 1928, Serial No. 324,317, and in Germany December 20, 1927.

The present invention relates to the manufacture of mixed fertilizers.

We have found that excellent mixed fertilizers, containing potash and nitrogen, are obtained from the nitrates of calcium or magnesium or mixtures of both by treating an aqueous solution thereof with potassium nitrate and converting the mixture into a solid product, as for example by spraying or by evaporation, preferably in vacuo. The process may be carried out by adding solid potassium nitrate to a concentrated solution of calcium nitrate, for example, with the aid of a worm agitator, mixing drum, kneading machine or the like. According to this method of working, large quantities of potassium nitrate pass into solution, and the resulting solution of mixed salts can then be converted into solid products, for example, by spraying by mechanical means or by passing over heated rollers. The results obtainable in accordance with the present process are surprising, the solution of calcium nitrate being capable of dissolving very large quantities of potassium nitrate in contrast to an experience of practice in salting out one salt by adding another salt. The potassium nitrate employed can be also replaced by equivalent amounts of potassium chlorid and nitric acid or nitrous gases, passed through the mixture. If a highly concentrated solution, or a suspension, of, for example, calcium nitrate be employed, mechanical treatment with solid potassium nitrate will be sufficient. The fertilizer thus produced should preferably not contain much more water than 2 molecular proportions of $H_2O$ to 1 molecular proportion of $Ca(NO_3)_2$ which effect is obtained by stirring solid potassium nitrate into a highly concentrated and heated solution of calcium nitrate. The mixed fertilizers produced according to this invention possess the valuable properties of being perfectly stable to storage and of being readily distributable. They can be produced with any ratio of potash to nitrogen that is desirable for practical purposes, without fear of the components separating out. In order to obtain a mixed fertilizer which is favorable from the physiological point of view, it is advisable to take such an amount of potassium nitrate that the proportion of nitrogen in relation to potash in the final product will be from about 1:1.0 up to 1:2.7.

As mentioned above, the calcium nitrate solution can be wholly or in part replaced by magnesium nitrate solutions. The said magnesium nitrate solutions are preferably obtained from kieserite or dolomite. Owing to the low molecular weight of magnesium nitrate, its employment affords the advantage over calcium nitrate that a mixed fertilizer is obtained in which the content of nitrogen, potash, and under certain conditions, phosphoric acid, is higher, for a given weight of fertilizer, than in a mixture prepared with solutions of calcium nitrate solely. When employing in the aforesaid process a solution which contains magnesium nitrate as well as calcium nitrate, anhydrous mixed fertilizers, the active constituents of which are present in high concentration, and which have excellent stability when stored, are obtained readily even at relatively low temperatures. For example, by employing relative quantities of calcium nitrate, magnesium nitrate and potassium nitrate in the molecular ratio of 1:1:4, i. e. by employing say 164 parts by weight of $Ca(NO_3)_2$, about 148 parts by weight of $Mg(NO_3)_2$ and about 404 parts by weight of $KNO_3$ and by concentration by evaporation in vacuo at a temperature of about from 110° to 130° C., an anhydrous product is obtained. In this case the mixed fertilizer obtained contains 1.66 parts of $K_2O$ to each part of N. After the water has been completely expelled, still more potassium salt may be added, since it is soluble in large quantities in the anhydrous melt at from 110° to 120°C.

Instead of preparing the calcium nitrate from limestone and then adding magnesium nitrate, dolomite, which already contains magnesium, may be converted into a mixture of the said nitrates by means of nitric acid.

In order to obtain the same relative proportions of nitrogen and potash, a portion of the calcium nitrate or magnesium nitrate may be replaced by ammonium nitrate, either in the solid state or in solution. A mixed fertilizer produced in this way possesses the same valuable properties as those possessed by the fertilizer prepared solely from potassium nitrate and calcium or magnesium nitrate or a mixture of both.

Instead of ammonium nitrate urea can be employed whereby a product is also obtained in which all the physiologically active constituents are present in a concentrated form. The hot liquids resulting from the mixing process are so fluid, even when molecular quantities of calcium nitrate and urea are employed, that they can be easily transformed into a distributable product, which is stable in storage.

By the incorporation of phosphoric salts of fertilizing value, during or after the aforesaid process, a fertilizer is obtained which contains all the main nutrient substances, that is to say nitrogen in the form of nitrate, phosphoric acid, and, as desired, ammonia, potash and lime in a form readily assimilable by plants. The phosphates to be employed may be of any kind, including double phosphates, such as ammonium-magnesium phosphate and the like, but those which have to be mainly considered are the phosphates of potash and lime, and, as regards the latter, dicalcium phosphate (precipitate) in particular. When a potassium phosphate is used, the amount of potassium nitrate may be reduced. In the latter event, a fertilizer containing potassium, nitrogen and phosphoric acid is obtained in which the relative proportions of $K_2O$ and $P_2O_5$ are determined by the amount of potassium phosphate employed. Also anhydrous diammonium phosphate and, if desired, other fertilizer salts may be added to the melt after removal of water. Owing to the method of their production all the mixed fertilizers produced according to this invention are of such a character that separation of their component parts is impossible.

The following examples will further illustrate the nature of the said invention which, however, is not limited thereto. The parts are by weight.

*Example 1*

A solution of calcium nitrate containing 69.5 per cent of that salt is treated at 70° C. with an amount of solid potassium nitrate corresponding to 123 parts of the latter to 100 parts of the former substance. The added potassium nitrate dissolves readily in the calcium nitrate solution. On spraying, a mixed fertilizer is obtained, in which the ratio of N to $K_2O$ is 1 to 1.65.

*Example 2*

100 parts of a mixed solution of calcium and potassium nitrates, which is saturated at 20° C. and contains 27.4 per cent of potassium nitrate and 45.5 per cent of calcium nitrate, are kneaded, at ordinary temperature with 66 parts of solid potassium nitrate. A product is obtained, in which the ratio of N to $K_2O$ is 1 to 1.8.

*Example 3*

The potassium nitrate may be formed in the mixture itself, to which end the following procedure may, for example, be adopted.

219 parts of calcium nitrate solution, containing 75 per cent of that salt, are treated with 200 parts of 63 per cent nitric acid, 149 parts of potassium chlorid being gradually introduced into the mixture. The potassium chlorid reacts with the nitric acid to form potassium nitrate, together with hydrochloric acid and nitrogen oxids. When the liberation of these gases has ceased, a little more nitric acid is added to the mixture until no further chlorine reaction can be discerned. In order to obtain a complete fertilizer, phosphates may be added to the reaction product.

The nitric acid may be replaced by nitrous gases, these being passed through the solution containing calcium nitrate and potassium chlorid. In order to prevent loss of nitrogen, the nitrogen oxids escaping with the hydrochloric acid may be absorbed, for example in sulfuric acid, or recovered in any other known and suitable manner.

*Example 4*

30 parts of urea and 330 parts of potassium nitrate are dissolved, at 130° C., in 219 parts of a calcium nitrate solution containing 65 per cent of calcium nitrate. The resulting clear liquid is caused to crystallize, and the deposited salt is crushed in any known or suitable manner after separation from the mother liquor. The urea can be replaced partly or completely by an equivalent amount of ammonium nitrate, if so desired.

*Example 5*

A solution containing 20.4 per cent of calcium nitrate, 18.3 per cent of magnesium nitrate and 50.2 per cent of potassium nitrate is concentrated by evaporation in vacuo at 120° C. An anhydrous clear melt is obtained. 13.5 parts of potassium nitrate and 51 parts of diammonium phosphate are then introduced into 165 parts of this melt. The whole of the potassium nitrate and the majority of the diammonium phosphate dissolve in the melt. By cooling, a product containing 16.9 per cent of N, 12.5 per cent of $P_2O_5$ and 21.1 per cent of $K_2O$ crystallizes out. The calcium or magnesium nitrate can be partly replaced by urea or ammonium nitrate or a mixture of both.

*Example 6*

220 parts of potassium nitrate and 140 parts of dicalcium phosphate are stirred into 200 parts of an aqueous solution of calcium nitrate of 82 per cent strength at about 125° C., whereupon the mass is caused to crystallize, and the deposited salt is crushed in any known or suitable manner. The product obtained contains 10.5 per cent of N, 13.1 per cent of $P_2O_5$ and 18.4 per cent of $K_2O$, corresponding to a relative proportion of $$N : P_2O_5 : K_2O = 1 : 1.25 : 1.75$$

What we claim is:—

1. A process for the manufacture of mixed fertilizers which comprises treating an aqueous dispersion comprising magnesium nitrate with potassium nitrate.

2. A process for the manufacture of mixed fertilizers which comprises treating a concentrated aqueous dispersion comprising magnesium nitrate with potassium nitrate.

3. A process for the manufacture of mixed fertilizers which comprises treating an aqueous dispersion comprising magnesium nitrate with an amount of potassium nitrate corresponding to a proportion, in the final product, of nitrogen to potash of from about 1:1 up to 1:2.7.

4. As new articles of manufacture stable and easily distributable mixed fertilizers comprising magnesium nitrate and potassium nitrate in which fertilizers the ratio of nitrogen to potash is from 1:1 to 1:2.7.

5. As new articles of manufacture stable and easily distributable mixed fertilizers comprising magnesium nitrate and potassium nitrate in which fertilizers the ratio of nitrogen to potash is from 1:1 to 1:2.7 and not substantially more water is present than one molecular proportion of water per each molecular proportion of magnesium nitrate.

6. A process for the manufacture of mixed fertilizers which comprises treating an aqueous dispersion comprising magnesium nitrate with potassium chloride and nitric acid.

7. A process for the manufacture of mixed fertilizers which comprises treating an aqueous dispersion of calcium nitrate and magnesium nitrate with potassium nitrate.

8. A process for the manufacture of mixed fertilizers which comprises treating an aqueous dispersion comprising magnesium nitrate and a derivative of ammonia of the group consisting of ammonium nitrate and urea with potassium nitrate.

9. As new articles of manufacture stable and easily distributable mixed fertilizers comprising magnesium nitrate, a derivative of ammonia of the group consisting of ammonium nitrate and urea, and potassium nitrate in which fertilizers the ratio of nitrogen to potash is from 1:1 to 1:2.7.

10. A process for the manufacture of mixed fertilizers which comprises treating an aqueous dispersion comprising magnesium nitrate with potassium nitrate and adding a phosphate of fertilizing value.

11. As new articles of manufacture stable and easily distributable mixed fertilizers comprising magnesium nitrate, a phosphate of fertilizing value and potassium nitrate in which fertilizers the ratio of nitrogen to potash is from 1:1 to 1:2.7.

12. As new articles of manufacture stable and easily distributable mixed fertilizers comprising magnesium nitrate, dicalcium phosphate and potassium nitrate in which fertilizers the ratio of nitrogen to potash is from 1:1 to 1:2.7.

13. As new articles of manufacture stable and easily distributable mixed fertilizers comprising magnesium nitrate, a phosphate of fertilizing value and potassium nitrate in which fertilizers the ratio of $N : P_2O_5 : K_2O$ is $1 : (1\ to\ 2) : (1\ to\ 2)$.

14. As new articles of manufacture stable and easily distributable mixed fertilizers comprising calcium nitrate, magnesium nitrate, potassium nitrate and a phosphate of fertilizing value, in which fertilizers the ratio of nitrogen to potash is from 1:1 to 1:2.7.

15. As new articles of manufacture stable and easily distributable mixed fertilizers comprising calcium nitrate, magnesium nitrate, potassium nitrate and a phosphate of fertilizing value, in which fertilizers the ratio of $N : P_2O_5 : K_2O$ is $1 : (1\ to\ 2) : (1\ to\ 2)$.

16. As new articles of manufacture stable and easily distributable mixed fertilizers comprising calcium nitrate, magnesium nitrate, a derivative of ammonia of the group consisting of ammonium nitrate and urea, a phosphate of fertilizing value and potassium nitrate, in which fertilizers the ratio of nitrogen to potash is from 1:1 to 1:2.7.

17. As new articles of manufacture stable and easily distributable mixed fertilizers comprising calcium nitrate, magnesium nitrate, urea, a phosphate of fertilizing value and potassium nitrate, in which fertilizers the ratio of nitrogen to potash is from 1:1 to 1:2.7.

18. As new articles of manufacture stable and easily distributable mixed fertilizers comprising magnesium nitrate, a phosphate of fertilizing value, urea and potassium nitrate in which fertilizers the ratio of nitrogen to potash is from 1:1 to 1:2.7.

19. As new articles of manufacture stable and easily distributable mixed fertilizers comprising magnesium nitrate, a phosphate of fertilizing value, urea, ammonium nitrate and potassium nitrate in which fertilizers the ratio of nitrogen to potash is from 1:1 to 1:2.7.

In testimony whereof we have hereunto set our hands.

ERNST JAENECKE.
FRIEDRICH FROWEIN.